INVENTOR.
Karl L. Herrmann

Sept. 10, 1935.　　　K. L. HERRMANN　　　2,014,203
MACHINE FOR FORMING ROLLER BLANKS
Filed March 22, 1934　　　3 Sheets-Sheet 3
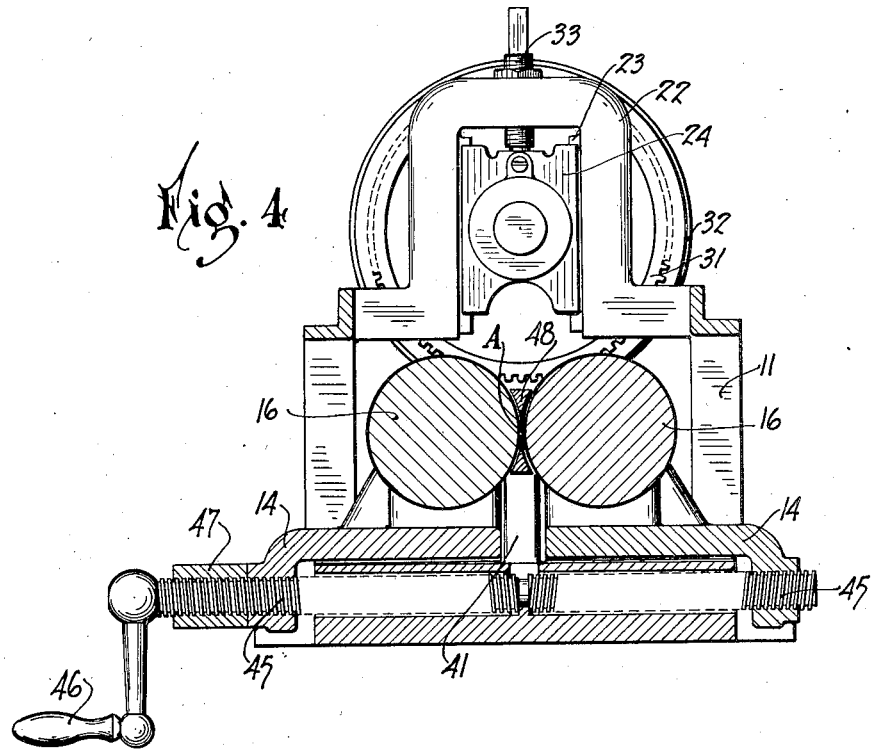
Fig. 4
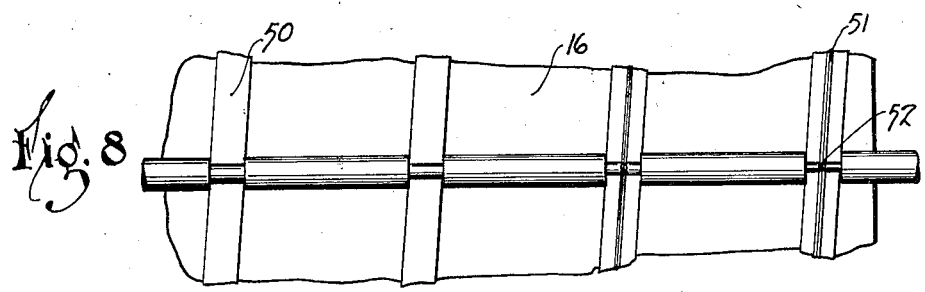
Fig. 8
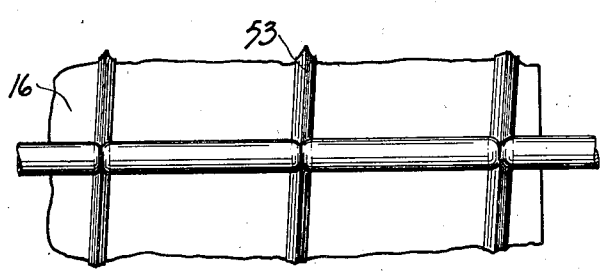
Fig. 10
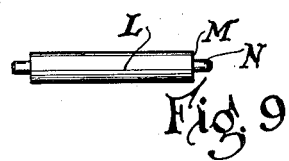
Fig. 9
Fig. 11
INVENTOR.
Karl L. Herrmann
BY
ATTORNEY Patented Sept. 10, 1935

2,014,203

UNITED STATES PATENT OFFICE 2,014,203

MACHINE FOR FORMING ROLLER BLANKS

Karl L. Herrmann, South Bend, Ind.

Application March 22, 1934, Serial No. 716,776

6 Claims. (Cl. 80—23)

This invention relates to a machine for dividing rods into predetermined lengths to form blanks adapted to be finished into quill rollers for use in anti-friction bearings.

The principal object of my invention is to provide a machine which will rapidly and economically form depressions in a rod and cause the rod to break at each of the depressed portions to provide blanks of equal lengths.

Another object is to provide a machine having a pair of rollers rotatable in the same direction on which are formed threads or spiral teeth of increasing size to deform the portions of a rod passed therebetween to thereby form roller blanks of given lengths.

Another object is to provide a machine for dividing rods into blanks of equal lengths adapted to be finished into quill rollers in which the rod is rotated between a pair of rollers rotatable in the same direction and having threads of increasing size thereon to deform the rod at spaced intervals, together with means to break the blanks at the connected portions.

Other objects and objects relating to details of construction and methods of manufacture will be apparent from the detailed description to follow.

The drawings which are illustrative of a machine and method for deforming rods to provide blanks for quill rollers to enable others to make and use my invention, are for the purpose of illustration only, and not as limiting the scope of the invention, the scope of which is to be governed entirely by the scope of the sub-joined claims.

Referring to the drawings in which like numerals refer to like parts throughout the several views, Fig. 1 is a side elevation of the machine embodying my invention, certain parts being shown in section to better illustrate the invention.

Fig. 4 is a transverse sectional view taken on the line 4—4 of Fig. 1, showing the means for adjusting the position of the blank forming rollers relative to each other.

Fig. 5 is a fragmentary sectional view showing the means for breaking off the connecting portions of the blanks after they have passed through the machine.

Fig. 6 is a diagrammatic fragmentary view showing the manner in which the rod is deformed to produce the roller blanks.

Fig. 7 is a side elevational view of one of the roller blanks produced by the rollers having the form of threads thereon shown in Figs. 1, 2 and 6.

Fig. 8 is a view similar to Fig. 6, showing a modified form of threads on the blank forming rollers to produce a blank having a different shaped end.

Fig. 9 is a side elevational view of the roller blank produced by the blank forming rollers shown in Fig. 8.

Fig. 10 is a fragmentary view similar to Fig. 6, showing a further modified form of forming roller blanks.

Fig. 11 is a side elevational view of one of the roller blanks produced by the blank forming rollers shown in Fig. 10.

Figure 1:
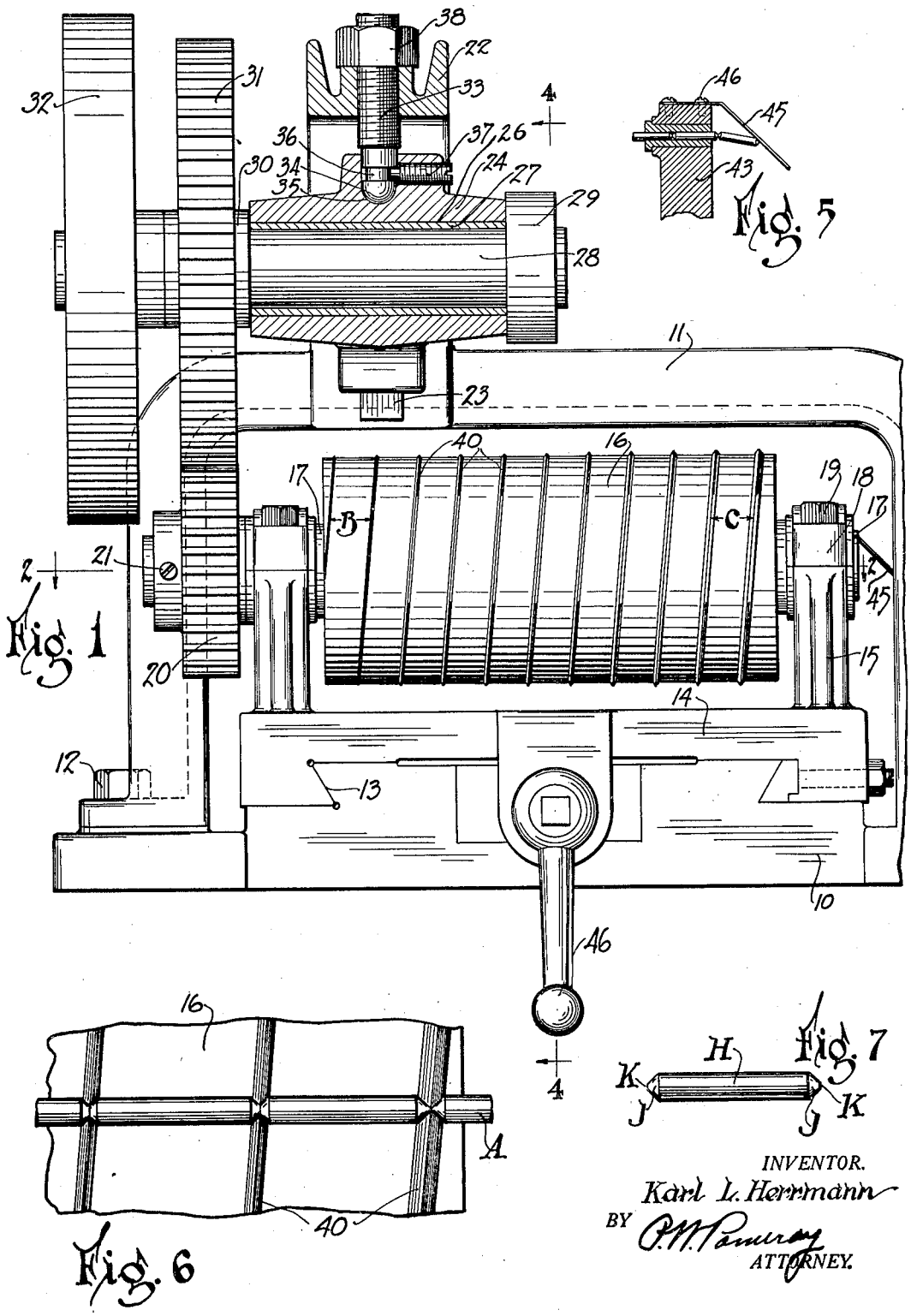

As illustrated, my machine for forming roller blanks which are preferably of relatively small diameters is provided with a base 10 on which is mounted a U-shaped frame 11 secured to the base by the bolts 12. The base 10 is also provided with ways 13 extending transversely thereof on which is mounted a roller supporting base 14 having standards or bearing supports 15 extending upwardly therefrom formed to provide the lower half of the bearing for the rollers presently to be described. The rollers 16 have journaled ends 17 rotatably mounted in the bearings formed in the standards 15 which are maintained in position by the bearing caps 18 secured by bolts 19 screw-threaded into the standards 15. Attached to the forward journaled ends 17 of each of the rollers 16 is a gear 20 held against rotation thereon by any suitable means as by the set screws 21.

Extending upwardly from the frame 11 is a U-shaped portion 22 (see Fig. 4) which is provided on its inner faces with ways 23 formed to slidably receive the bearing member 24. The bearing member 24 has a cylindrical bore 26 therethrough in which is inserted a bushing 27 and through which extends a stub shaft 28. The stub shaft 28 is maintained against longitudinal movement in one direction by the collar 29 and in the opposite direction by a journal 30 formed on the gear 31. Adjacent to the gear 31 is a driving pulley 32 also fixed against rotation on the shaft 28. The gear 31 is adapted to mesh with the gears 20 rotatable with the rollers 16.

To provide vertical adjustment of the gear 31 a screw 33 is threaded through the frame portion 22 and has a plain cylindrical inner end 34 seating in a recess 35 formed in the bearing 24. The screw 33 has a reduced portion 36 adjacent to its end 34 into which extends the end of a screw 37 threaded into the bearing 24 transversely of the screw 33. To raise or lower the bearing 24 and with it the gear 31, the screw 33 is turned in a clockwise or anti-clockwise direction after which the lock nut 38 may be tightened on the screw 33 to maintain the bearing and the gear 31 in the set position.

Figure 2:
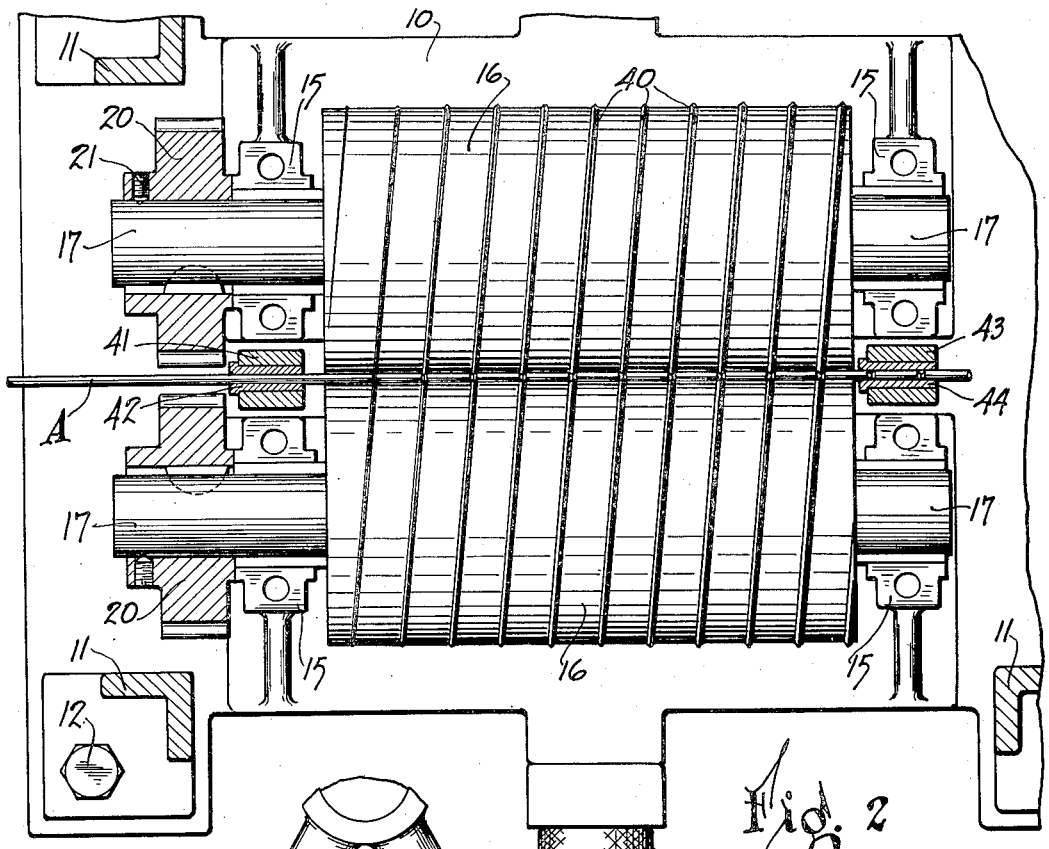
Fig. 2 is a longitudinal sectional view taken on the line 2—2 of Fig. 1.

As illustrated in Figs. 1, 2 and 6, the rollers 16 are provided with threads or spiral teeth 40 thereon which are of increasing size from the rod-receiving end of the machine to the discharge end thereof. At the rod-receiving end of the machine, a standard 41 extends upwardly from the base 10 which is drilled adjacent to its upper end to receive the bushing 42 having an internal diameter of the proper size to receive the rod A which is to be formed into equal lengths by the threads 40 formed on the rollers 16. At the discharge end of the machine there is an upwardly extending standard 43 similar to the standard 41 which is drilled adjacent to its upper end to receive the bushing 44 through which the deformed end of the rod is pushed during the operation of the machine.

As it is desirable to adjust the rollers 16 relative to each other, I have shown in Fig. 4 a screw 45 having right and left-hand threads thereon which is supported in the base 10 and which extends through threaded openings in the roller supporting base 14. A handle 46 is attached to the screw 45 which may be turned to rotate the screw and, therefore, move the rollers 16 toward or away from each other, the same being held in adjusted position by the lock nut 47.

As the gear 31 is rotatable with the driving pulley 32 and as the gear 31 is in mesh with the gears 20 which are spaced from each other, the rollers 16 will be caused to rotate in the same direction. As the rod A is inserted through the bushing 42 so that its end will engage with the first tooth of the thread 40 on the rollers, the rod A will be caused to rotate with the rollers and also travel toward the rear of the machine and in so doing the threads 40 which are of increasing height, will deform the rod at spaced intervals so that when it has passed between the rollers, there will be only a small amount of metal connecting the roller blanks. As the rollers do not cut away any of the metal but merely deform the rod, and therefore increases its length slightly, it may be desirable to increase the pitch of the thread along the rollers so that the distance B between the threads at the front end of the machine is slightly less than the distance C between the finished end thereof. The rod is pushed out of the rear of the machine due to the driving force exerted by the rotation of the rollers, and I provide a shield or break off member 45 attached by bolts 46 or other suitable means to the standard 43 to completely sever the blanks. As shown in Fig. 5, the break off member 45 is formed at an angle to the longitudinal axis of the roller blank so that as the roller blank contacts therewith, it is pushed downwardly to break off the same.

As before stated, the rollers 16 are adjustable relative to each other, this being of an advantage as it is desirable to form roller blanks from rods having different diameters in the same machine. Also, it is desirable to regulate or adjust the distance between the threads 40 on the rollers 16 so as to leave the desired amount of metal between the ends of the roller blanks before they are broken off. When it is desired to adjust the rollers, the gear 31 may be backed away from the gears 20 by turning the screw 33 to raise the gear 31 out of engagement with the gears 20. The screw 45 may then be rotated by the handle 46 to move the rollers 16 toward or away from each other to the desired position to leave the proper space therebetween. The screw 33 may then be rotated in the opposite direction and the gear 31 again brought into engagement with the gears 20 whereupon the driving engagement is again completed and the machine is ready for operation. When it is desired to run rods having a different diameter through the machine to form them into blanks, the bushings 42 and 44 may be replaced with bushings having the proper inner diameters to hold the rod in true axial alignment between the rollers 16.

Figure 3:
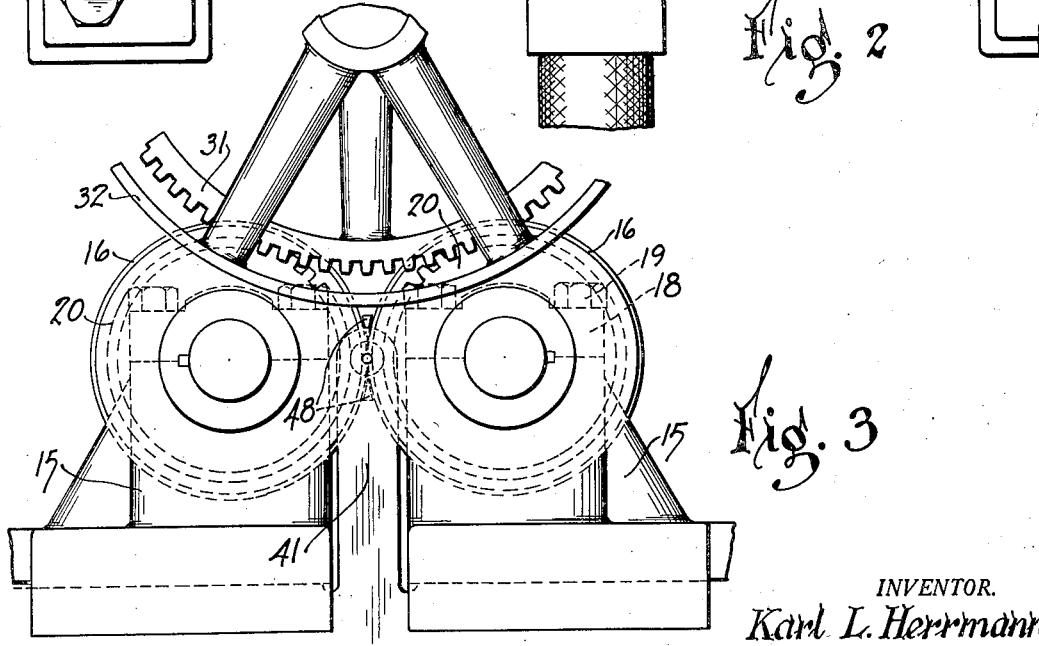
Fig. 3 is a fragmentary end elevational view showing the blank forming rollers and drive therefor.

Due to the rotation of the rollers 16 in the same direction and the rotation of the rod A relative thereto, it is desirable to provide means for guiding the rod between the rollers which will prevent the same from springing out of axial alignment therewith. As shown in Figs. 3 and 4, I have provided a blade 48 which may be attached at its ends to the standards 41 and 43 which has an opening extending longitudinally therethrough to maintain the rod A in proper position relative to the rollers. If desired the blade 48 may be formed of two members and adjustable vertically relative to each other for different sized rods.

In Fig. 6 I have illustrated diagrammatically and on an enlarged scale portions of the rollers 16 and the design of threads or spiral teeth formed thereon to produce the roller blank shown in Fig. 7. These threads are wedge-shaped in cross section starting with a very small thread at the forward end of the machine and terminating in relatively deep or large thread at the finished end thereof so that the blanks H have tapered end portions J and a flat portion K. The blanks H are held together by the small portions K and are broken off at that point when the tapered portions J ride against the break off member 45 as shown in Fig. 5 to thereby provide roller blanks which are all of equal length and ready for the finishing operation.

In Fig. 8, I have shown a modified form of threads on the rollers 16 which are formed to produce roller blanks L having shoulders M and reduced cylindrical end portions N. In forming roller blanks as shown in Fig. 9, the threads 50 on the rollers 16 at the forward end of the machine are relatively flat but increase in depth to finally the shape shown at the right hand of Fig. 8. To assist in breaking off the roller blank L, I provide a V-shaped projection 51 on the threads 50 adjacent to the rear of the rollers so as to form a little groove 52 in the roller ends N so that the roller blanks will always break off at the same point, and therefore, produce blanks of equal length. When it is desired to form roller blanks as shown in Fig. 9, the form of the thread 50 will extrude the metal of the rod A somewhat more than in the construction shown in Fig. 7 so, therefore, it may be desirable to form the threads 50 on the rollers 16 with a slightly greater increase in pitch.

The roller blanks O shown in Fig. 11 are formed with cylindrical ends P which are formed by threads 53 on the rollers 16 similar to the V-shaped thread 40 as shown in Fig. 6, except that the threads are somewhat concave in shape to produce roller blanks having the ends shaped as illustrated. In this construction, the threads 53 are of increasing size and also of slightly increasing pitch to properly act upon the rod and compensate for any extrusion of the metal to produce roller blanks of equal length which have a relatively small connecting portion so that they can be broken off in the same manner as illustrated in Fig. 5.

While I have shown a machine embodying one embodiment of my invention and rollers having three different designs of threads thereon to produce roller blanks having three different shaped ends, it will be well understood by those skilled in the art that various changes and modifications can be made both in the structure of the machine and in the design of threads on the blank forming rollers without departing from the spirit and substance of my invention and I, therefore, do not desire to limit my invention to the exact structure shown but the same is to be limited only by the scope of the sub-joined claims.

What I claim is:

1. A machine for forming roller blanks from a cylindrical rod comprising, a frame, a pair of spaced rollers having journals at opposite ends thereof supported by said frame, gears on said journals, means to simultaneously move said rollers and gears in opposite directions to provide for rods having different diameters, a gear meshing with said first gears to rotate said rollers in the same direction, means to adjust said gear into driving engagement with said first gears, means for guiding said rod at opposite ends of said rollers, means for maintaining said rod in axial alignment between said rollers, and means to progressively feed said rod between said rollers, said means also forming equally spaced depressions in said rod.

2. A machine for forming roller blanks from a cylindrical rod comprising, a frame, a pair of spaced rollers having journals at opposite ends thereof supported by said frame, gears on said journals, means to simultaneously move said rollers and gears in opposite directions to provide for rods having different diameters, a gear meshing with said first gears to rotate said rollers in the same direction, means to adjust said gear into driving engagement with said first gears, means for guiding said rod at opposite ends of said rollers, means for maintaining said rod in axial alignment between said rollers, means for feeding said rod between said rollers and simultaneously forming depressions therein, and a break off member to break the metal at the depressed portions of said rod.

3. A machine for forming roller blanks of equal lengths from cylindrical rods having different diameters comprising, a frame, a pair of spaced rollers supported thereby, means to simultaneously move said rollers fore and aft to accommodate the different diameters of rods, means for supporting said rod in axial alignment with said rollers, threads on said rollers to progressively feed said rod therebetween, said threads also forming progressively deeper depressions in said rod with metal connecting said blanks, and means rearwardly of said rollers for breaking the metal at the depressed portions of said rod.

4. A device for forming roller blanks from a cylindrical rod comprising, spaced supports, a pair of rollers rotatable in the same direction carried by said supports, flat faced threads on said rollers to extrude the metal of said rod to form portions thereon having a reduced diameter, and means on said rollers beyond said flat faced threads to form depressions in said reduced rod portions.

5. A device for forming roller blanks from a cylindrical rod comprising, spaced supports, a pair of rollers rotatable in the same direction carried by said supports, flat faced threads on said rollers to extrude the metal of said rod to form portions thereon having a reduced diameter, means on said rollers beyond said flat faced threads to form depressions in said reduced rod portions, and means rearwardly of said first means to break the metal at the depressed portions of said rod.

6. A machine for forming cylindrical blanks from a rod comprising, a pair of rollers, supports for said rollers, guides for the rod adjacent to the ends of said rollers, threads of increasing size and pitch on said rollers forming tapered ends on each blank, said threads also causing said rod to progressively travel between said rollers, and means positioned rearwardly and independently of said rollers to break the metal joining said blanks between the adjacent tapered ends thereof.

KARL L. HERRMANN.